United States Patent
Hashimoto et al.

(10) Patent No.: US 12,311,635 B2
(45) Date of Patent: May 27, 2025

(54) LAMINATE FOR PAPER CONTAINER AND PAPER CONTAINER

(71) Applicant: DOW-MITSUI POLYCHEMICALS CO., LTD., Tokyo (JP)

(72) Inventors: Hidenori Hashimoto, Chiba (JP); Koichiro Yamamoto, Chiba (JP); Takuya Ogata, Chiba (JP)

(73) Assignee: DOW-MITSUI POLYCHEMICALS CO., LTD., Tokyo (JP)

( * ) Notice: Subject to any disclaimer, the term of this patent is extended or adjusted under 35 U.S.C. 154(b) by 624 days.

(21) Appl. No.: 17/423,231

(22) PCT Filed: Jan. 7, 2020

(86) PCT No.: PCT/JP2020/000187
§ 371 (c)(1),
(2) Date: Jan. 12, 2022

(87) PCT Pub. No.: WO2020/149174
PCT Pub. Date: Jul. 23, 2020

(65) Prior Publication Data
US 2022/0134709 A1    May 5, 2022

(30) Foreign Application Priority Data
Jan. 18, 2019    (JP) ................. 2019-007189

(51) Int. Cl.
*B32B 15/12*    (2006.01)
*B32B 7/12*    (2006.01)
(Continued)

(52) U.S. Cl.
CPC ............... *B32B 15/12* (2013.01); *B32B 7/12* (2013.01); *B32B 15/085* (2013.01); *B32B 15/20* (2013.01);
(Continued)

(58) Field of Classification Search
None
See application file for complete search history.

(56) References Cited

U.S. PATENT DOCUMENTS

2018/0134928 A1    5/2018    Cocquet et al.

FOREIGN PATENT DOCUMENTS

JP    7-148895 A    6/1995
JP    2000-272066 A    10/2000
(Continued)

OTHER PUBLICATIONS

Suzuki, Heat Insulating Sheet, Jan. 6, 2011, machine translation of JP2011-000835 (Year: 2011).*
(Continued)

*Primary Examiner* — Chinessa T. Golden
(74) *Attorney, Agent, or Firm* — RANKIN, HILL & CLARK LLP (57) ABSTRACT

An aspect of the present invention is a laminate for a paper container (100). The laminate for a paper container (100) includes a laminate (140) in which a paper base material layer (110), an adhesive layer (120), and a barrier layer (130) are laminated in this order. The adhesive layer (120) includes a resin composition (A) containing one type or more selected from the group consisting of an ethylene/unsaturated carboxylic acid/unsaturated carboxylic acid ester copolymer, an ethylene/unsaturated carboxylic acid copolymer, and an ethylene/unsaturated carboxylic acid ester copolymer and including at least the ethylene/unsaturated carboxylic acid/unsaturated carboxylic acid ester copolymer. A melt flow rate (MFR) of the resin composition (A) at 190° C. and with a load of 2160 g is 9.0 g/10 min or less, based on JIS K7210: 1999.

13 Claims, 1 Drawing Sheet

(51) Int. Cl.
  *B32B 15/085* (2006.01)
  *B32B 15/20* (2006.01)
  *B32B 27/10* (2006.01)
  *B32B 27/32* (2006.01)
  *B32B 37/12* (2006.01)

(52) U.S. Cl.
  CPC .............. *B32B 27/10* (2013.01); *B32B 27/32* (2013.01); *B32B 37/1284* (2013.01); *B32B 2250/02* (2013.01); *B32B 2250/04* (2013.01); *B32B 2307/31* (2013.01); *B32B 2307/7246* (2013.01); *B32B 2307/7248* (2013.01); *B32B 2439/00* (2013.01)

(56) References Cited

FOREIGN PATENT DOCUMENTS

| JP | 2006168775 A | * | 6/2006 |
| JP | 2009-018420 | | 1/2009 |
| JP | 2009018420 A | * | 1/2009 |
| JP | 2011-835 A | | 1/2011 |
| JP | 2011000835 A | * | 1/2011 |
| JP | 2011-235926 A | | 11/2011 |
| JP | 2013-249069 A | | 12/2013 |
| JP | 2015-128907 A | | 7/2015 |
| JP | 2015-208866 A | | 11/2015 |

OTHER PUBLICATIONS

Ueda, Paper Container, Jun. 29, 2006, machine translation of JP2006-168775 (Year: 2006).*
Suzuki, N., Multilayer Laminate, Jan. 29, 2009, machine translation of JP2009-018420 (Year: 2009).*
Japanese Office Action (JPOA) dated Oct. 25, 2022 for JP2020-566379; English machine translation.
Extended European Search Report (EESR) dated Feb. 7, 2023 for European Patent Application No. 20741453.3.
Korean Office Action dated Sep. 6, 2023 issued in Korean Patent Application No. 10-2021-7025641 and its English machine translation.
International Search Report (ISR) dated Mar. 17, 2020 filed in PCT/JP2020/000187.

* cited by examiner

LAMINATE FOR PAPER CONTAINER AND PAPER CONTAINER

TECHNICAL FIELD

The present invention relates to a laminate for a paper container and a paper container.

BACKGROUND ART

Multi-layer paper containers are widely used as containers for various types of fruit drinks, fermented milk drinks, alcoholic drinks, and the like. The paper containers are generally formed of a laminate for a paper container consisting of polyethylene/a paper base material layer/an adhesive layer/a barrier layer/a sealant layer in order from the outside. An ethylene/unsaturated carboxylic acid copolymer or an ethylene/unsaturated carboxylic acid/unsaturated carboxylic acid ester copolymer is used for the adhesive layer (refer to Patent Document 1).

RELATED DOCUMENT

Patent Document

[Patent Document 1] Japanese Unexamined Patent Publication No. 7-148895

SUMMARY OF THE INVENTION

Technical Problem

In a case of forming a paper container, particularly a gable top container, using a laminate for a paper container, during sealing in the step of manufacturing the container, the inner surface of the paper container is heated by blowing hot air thereon and then pressed and sealed. However, when the hot air is blown, moisture contained in the paper base material layer is vaporized, which may cause a phenomenon called bubbling in which bubbles are generated between the paper base material layer and the adjacent layer, which is an adhesive layer in the above example. The generation of bubbling causes cracks in the barrier layer and sealing defects (insufficient strength or shifting of sealing position), increasing the possibility of the contents leaking, thus, the suppression of bubbling is important from the viewpoint of protecting the contents.

On the other hand, there is also a demand for the adhesive layer to have adhesion with a barrier layer in which various known films such as Al foil and PET film are used. As a specific adhesive strength, there is a demand for a strength which is able to withstand the period during which the contents are consumed after manufacturing the container.

However, in the laminates for a paper container of the related art, it is difficult to achieve both the bubbling suppression and the adhesion between the adhesive layer and various barrier layers described above and there remains room for improvement.

In consideration of the problems described above, the present invention has an object of providing a laminate for a paper container with excellent adhesion between an adhesive layer and various barrier layers while suppressing the generation of bubbling when the paper container is assembled, and a paper container formed of the laminate for a paper container.

Solution to Problem

According to the present invention, there is provided a laminate for a paper container including a laminate in which a paper base material layer, an adhesive layer, and a barrier layer are laminated in this order. The adhesive layer includes a resin composition (A) containing one type or more selected from the group consisting of an ethylene/unsaturated carboxylic acid/unsaturated carboxylic acid ester copolymer, an ethylene/unsaturated carboxylic acid copolymer, and an ethylene/unsaturated carboxylic acid ester copolymer and including at least the ethylene/unsaturated carboxylic acid/unsaturated carboxylic acid ester copolymer, and a melt flow rate (MFR) of the resin composition (A) at 190° C. and with a load of 2160 g is equal to or less than 9.0 g/10 min or less, based on JIS K7210: 1999.

In addition, according to the present invention, there is provided a paper container obtained by using the laminate for a paper container described above.

Advantageous Effects of Invention

According to the present invention, there is provided a laminate for a paper container with excellent adhesion between an adhesive layer and a barrier layer while suppressing the generation of bubbling when the paper container is assembled, and a paper container formed of the laminate for a paper container.

DESCRIPTION OF EMBODIMENTS

A detailed description will be given below of embodiments of the present invention. In the present specification, the notation "a to b" in the explanation of numerical ranges means a or more and b or less unless otherwise specified. In addition, in the present embodiment, "(meth)acryl" means acrylic, methacrylic, or both acrylic and methacrylic.

Figure 1:
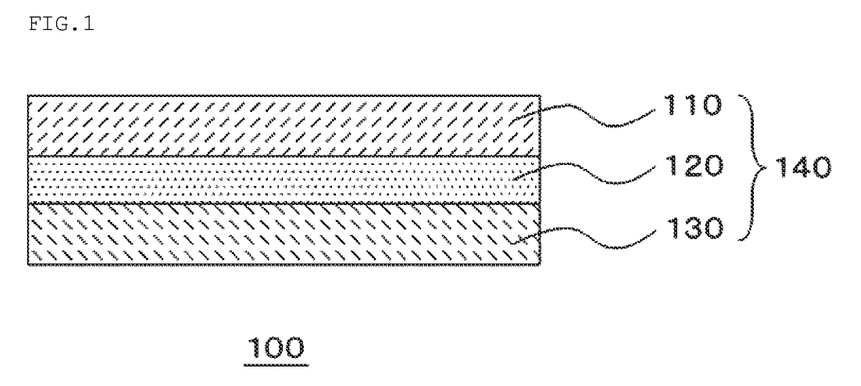
FIG. 1 is a schematic cross-sectional view showing a laminated structure of a laminate for a paper container according to Embodiment 1.

FIG. 1 is a schematic cross-sectional view showing the laminated structure of a laminate for a paper container 100 according to Embodiment 1. As shown in FIG. 1, the laminate for a paper container 100 according to the present embodiment includes a laminate 140 in which a paper base material layer 110, an adhesive layer 120, and a barrier layer 130 are laminated in this order.

As a material for the paper base material layer 110, it is possible to suitably use a cup base paper consisting of virgin pulp having a basis weight of approximately 200 to 450 g/m$^2$, without being limited thereto. In addition, it is possible to provide a printing layer (not shown) on the outer surface of the paper base material layer 110 as necessary.

In addition, in order to increase the adhesive strength, the paper base material layer 110 may be subjected to a physical treatment such as a corona treatment, a plasma treatment, a flame treatment, and an ozone treatment, or a chemical treatment such as an anchor coating treatment.

The adhesive layer 120 includes a resin composition (A). The resin composition (A) contains one type or more selected from the group consisting of an ethylene/unsaturated carboxylic acid/unsaturated carboxylic acid ester copolymer, an ethylene/unsaturated carboxylic acid copolymer, and an ethylene/unsaturated carboxylic acid ester copolymer and includes at least the ethylene/unsaturated carboxylic acid/unsaturated carboxylic acid ester copolymer.

In other words, there are cases where the resin composition (A) includes an ethylene/unsaturated carboxylic acid/unsaturated carboxylic acid ester copolymer, but does not include either of the ethylene/unsaturated carboxylic acid copolymer and the ethylene/unsaturated carboxylic acid ester copolymer and cases where a mixture of an ethylene/unsaturated carboxylic acid/unsaturated carboxylic acid ester copolymer and the ethylene/unsaturated carboxylic acid copolymer and/or the ethylene/unsaturated carboxylic acid ester copolymer is included.

The ethylene/unsaturated carboxylic acid/unsaturated carboxylic acid ester copolymer is an at least ternary copolymer obtained by copolymerizing ethylene, at least one type of unsaturated carboxylic acid, and at least one type of unsaturated carboxylic acid ester, and includes a structural unit derived from ethylene, a structural unit derived from an unsaturated carboxylic acid, and a structural unit derived from an unsaturated carboxylic acid ester.

The ethylene/unsaturated carboxylic acid/unsaturated carboxylic acid ester copolymer may be any of a block copolymer, a random copolymer, and a graft copolymer. From the viewpoint of industrial availability, the ethylene/unsaturated carboxylic acid/unsaturated carboxylic acid ester copolymer is preferably a random copolymer.

Examples of the unsaturated carboxylic acid used in the ethylene/unsaturated carboxylic acid/unsaturated carboxylic acid ester copolymer described above include unsaturated carboxylic acids having 3 to 8 carbon atoms and, specifically, it is possible to use an unsaturated carboxylic acid or half ester such as acrylic acid, methacrylic acid, 2-ethylacrylic acid, itaconic acid, itaconic anhydride, fumaric acid, crotonic acid, maleic acid, maleic anhydride, monomethyl maleate, or monoethyl maleate. Among these unsaturated carboxylic acids, acrylic acid and methacrylic acid are particularly preferably used. These unsaturated carboxylic acids may be used alone as one type or in a combination of two types or more.

Examples of the unsaturated carboxylic acid ester used in the ethylene/unsaturated carboxylic acid/unsaturated carboxylic acid ester copolymer described above include unsaturated carboxylic acid esters having 4 to 8 carbon atoms, unsaturated carboxylic acid alkyl esters are preferable, and specific examples thereof include isobutyl methacrylate, n-butyl methacrylate, ethyl methacrylate, methyl methacrylate, isobutyl acrylate, n-butyl acrylate, ethyl acrylate, and (meth)acrylic acid ester of methyl acrylate. These unsaturated carboxylic acid esters may be used alone as one type or in a combination of two types or more. Among these, at least one type selected from isobutyl (meth)acrylate and n-butyl (meth)acrylate (that is, butyl (meth)acrylate) is preferable.

In the present embodiment, the ethylene/unsaturated carboxylic acid/unsaturated carboxylic acid ester copolymer is more preferably an ethylene (meth)acrylic acid/(meth)acrylic acid ester copolymer, and particularly preferably at least one type selected from ethylene/(meth)acrylic acid/(meth)acrylic acid isobutyl copolymer and ethylene/(meth)acrylic acid/(meth)acrylic acid n-butyl copolymer.

In the present embodiment, "(meth)acrylic acid" means acrylic acid, methacrylic acid or acrylic acid and methacrylic acid, and possible examples of ethylene/(meth)acrylic acid/(meth)acrylic acid ester copolymer include ethylene/acrylic acid/acrylic acid ester copolymer, ethylene/methacrylic acid/acrylic acid ester copolymer, ethylene/acrylic acid/methacrylic acid ester copolymer, ethylene/methacrylic acid/methacrylic acid ester copolymer, and the like.

The ethylene/unsaturated carboxylic acid/unsaturated carboxylic acid ester copolymer according to the present embodiment may be used alone as one type or in a combination of two types or more.

In the ethylene/unsaturated carboxylic acid/unsaturated carboxylic acid ester copolymer according to the present embodiment, when the total of the ethylene/unsaturated carboxylic acid/unsaturated carboxylic acid ester copolymer is 100% by mass, the lower limit of the content of the structural unit derived from ethylene is preferably 60% by mass or more from the viewpoint of film forming processability, more preferably 65% by mass or more, even more preferably 70% by mass or more, and particularly preferably 75% by mass or more. On the other hand, the upper limit of the content of the structural unit derived from ethylene in the ethylene/unsaturated carboxylic acid/unsaturated carboxylic acid ester copolymer is preferably 98% by mass or less from the viewpoint of the adhesion of the resin composition (A), 97% by mass or less is more preferable, 96% by mass or less is even more preferable, 95% by mass is particularly preferable, and 94% by mass or less is the most preferable.

In the ethylene/unsaturated carboxylic acid/unsaturated carboxylic acid ester copolymer according to the present embodiment, when the total of the structural units forming the ethylene/unsaturated carboxylic acid/unsaturated carboxylic acid ester copolymer is 100% by mass, the lower limit of the content of the structural unit derived from the unsaturated carboxylic acid is preferably 1% by mass or more from the viewpoint of the adhesion of the resin composition (A), more preferably 1.5% by mass or more, and even more preferably 2% by mass or more.

On the other hand, the upper limit of the content of the structural unit derived from the unsaturated carboxylic acid in the ethylene/unsaturated carboxylic acid/unsaturated carboxylic acid ester copolymer is preferably 20% by mass or less from the viewpoint of film forming processability, more preferably 15% by mass or less, and even more preferably 10% by mass or less.

In the ethylene/unsaturated carboxylic acid/unsaturated carboxylic acid ester copolymer according to the present embodiment, when the total of the structural units forming the ethylene/unsaturated carboxylic acid/unsaturated carboxylic acid ester copolymer is 100% by mass, the lower limit of the content of the structural unit derived from the unsaturated carboxylic acid ester is preferably 1% by mass or more from the viewpoint of the adhesion of the resin composition (A), and more preferably 2% by mass or more.

On the other hand, the upper limit of the content of the structural unit derived from the unsaturated carboxylic acid ester in the ethylene/unsaturated carboxylic acid/unsaturated carboxylic acid ester copolymer is preferably 20% by mass or less from the viewpoint of processability, and more preferably 15% by mass or less.

When the melt flow rate (MFR) of the ethylene/unsaturated carboxylic acid/unsaturated carboxylic acid ester copolymer is measured based on JIS K7210: 1999 at 190° C. with a load of 2160 g, from the viewpoint of suppressing the generation of bubbling when assembling the paper container, 50 g/10 min or less is preferable, 30 g/10 min or less is more preferable, 15 g/10 min or less is even more preferable, and 9.0 g/10 min or less is yet more preferable. The lower limit of the MFR is not particularly limited, but from the viewpoint of resin processability such as film formation, 0.1 g/10 min or more is preferable, 1.0 g/10 min or more is more preferable, and 3.0 g/10 min or more is even more preferable.

The ethylene/unsaturated carboxylic acid/unsaturated carboxylic acid ester copolymer is a copolymer obtained by copolymerizing at least ethylene, an unsaturated carboxylic acid, and an unsaturated carboxylic acid ester, and may be a quaternary or higher multi-component copolymer in which a fourth copolymer component is copolymerized.

Examples of the fourth copolymer component include unsaturated hydrocarbons (for example, propylene, butene, 1,3-butadiene, pentene, 1,3-pentadiene, 1-hexene, and the like), vinyl esters (for example, vinyl acetate, vinyl propionate, and the like), oxides such as vinyl sulfuric acid and vinyl nitric acid, halogen compounds (for example, vinyl chloride, vinyl fluoride, and the like), vinyl group-containing primary and secondary amine compounds, carbon monoxide, sulfur dioxide, and the like.

The content of the structural unit derived from the fourth copolymer component in the ethylene/unsaturated carboxylic acid/unsaturated carboxylic acid ester copolymer is preferably in the range of 10% by mass or less from the viewpoint of production and mixing.

The method for manufacturing the ethylene/unsaturated carboxylic acid/unsaturated carboxylic acid ester copolymer according to the present embodiment is not particularly limited and manufacturing by a known method is possible. For example, it is possible to obtain the above by radical copolymerization of each polymerization component at high temperature and under high pressure. In addition, a commercially available ethylene/unsaturated carboxylic acid/unsaturated carboxylic acid ester copolymer may also be used.

The ethylene/unsaturated carboxylic acid copolymer is a copolymer obtained by copolymerizing ethylene and at least one type of unsaturated carboxylic acid and includes a structural unit derived from ethylene and a structural unit derived from an unsaturated carboxylic acid.

The ethylene/unsaturated carboxylic acid copolymer may be any of a block copolymer, a random copolymer, or a graft copolymer. From the viewpoint of industrial availability, the ethylene/unsaturated carboxylic acid copolymer is preferably a random copolymer.

Examples of the unsaturated carboxylic acid used in the ethylene/unsaturated carboxylic acid copolymer described above include unsaturated carboxylic acids having 3 to 8 carbon atoms and, specifically, unsaturated carboxylic acids or half esters such as acrylic acid, methacrylic acid, 2-ethylacrylic acid, itaconic acid, itaconic anhydride, fumaric acid, crotonic acid, maleic acid, maleic anhydride, monomethyl maleate, monoethyl maleate, and the like are used. Among these unsaturated carboxylic acids, acrylic acid and methacrylic acid are particularly preferably used. These unsaturated carboxylic acids may be used alone as one type or in a combination of two types or more.

The ethylene/unsaturated carboxylic acid copolymers according to the present embodiment may each be used alone as one type or in a combination of two types or more.

In the ethylene/unsaturated carboxylic acid copolymer according to the present embodiment, when the total of the ethylene/unsaturated carboxylic acid copolymer is 100% by mass, the content of the structural unit derived from ethylene is preferably 65% by mass to 97% by mass from the viewpoint of adhesion and processability, and more preferably 75% by mass to 95% by mass.

In the ethylene/unsaturated carboxylic acid copolymer according to the present embodiment, when the total of the ethylene/unsaturated carboxylic acid copolymer is 100% by mass, the content of the structural unit derived from the unsaturated carboxylic acid is preferably 3% by mass to 35% by mass from the viewpoint of adhesion and processability, and more preferably 5% by mass to 25% by mass.

When the melt flow rate (MFR) of the ethylene/unsaturated carboxylic acid copolymer is measured based on JIS K7210: 1999 at 190° C. with a load of 2160 g, 50 g/10 min or less is preferable, 25 g/10 min or less is more preferable, and 9.0 g/10 min or less is even more preferable from the viewpoint of suppressing the generation of bubbling when assembling the paper container. The lower limit of the MFR is not particularly limited, but 0.1 g/10 min or more is preferable from the viewpoint of resin processability such as film formation, 1.0 g/10 min or more is more preferable, and 3.0 g/10 min or more is even more preferable.

The ethylene/unsaturated carboxylic acid copolymer is a copolymer obtained by copolymerizing at least ethylene and an unsaturated carboxylic acid and may be a ternary or higher multi-component copolymer in which a third copolymer component is copolymerized.

Examples of the third copolymer component include unsaturated hydrocarbons (for example, propylene, butene, 1,3-butadiene, pentene, 1,3-pentadiene, 1-hexene, and the like), vinyl esters (for example, vinyl acetate, vinyl propionate, and the like), oxides such as vinyl sulfuric acid and vinyl nitric acid, halogen compounds (for example, vinyl chloride, vinyl fluoride, and the like), vinyl group-containing primary and secondary amine compounds, carbon monoxide, sulfur dioxide, and the like.

The content of the structural unit derived from the third copolymer component in the ethylene/unsaturated carboxylic acid copolymer is preferably in the range of 10% by mass or less from the viewpoint of production and mixing.

The method for manufacturing the ethylene/unsaturated carboxylic acid copolymer according to the present embodiment is not particularly limited, and manufacturing by a known method is possible. For example, it is possible to obtain the above by radical copolymerization of each polymerization component at high temperature and under high pressure. In addition, a commercially available ethylene/unsaturated carboxylic acid copolymer may also be used.

The ethylene/unsaturated carboxylic acid ester copolymer described above is a copolymer obtained by copolymerizing ethylene and at least one unsaturated carboxylic acid ester and includes a structural unit derived from ethylene and a structural unit derived from an unsaturated carboxylic acid ester.

The ethylene/unsaturated carboxylic acid ester copolymer may be any of a block copolymer, a random copolymer, and a graft copolymer. From the viewpoint of industrial availability, the ethylene/unsaturated carboxylic acid ester copolymer is preferably a random copolymer.

Examples of the unsaturated carboxylic acid ester used in the ethylene/unsaturated carboxylic acid ester copolymer described above include unsaturated carboxylic acid esters having 4 to 8 carbon atoms, unsaturated carboxylic acid alkyl esters are preferable, and specific examples thereof include (meth)acrylic acid esters of isobutyl methacrylate, n-butyl methacrylate, ethyl methacrylate, methyl methacrylate, isobutyl acrylate, n-butyl acrylate, ethyl acrylate, and methyl acrylate. These unsaturated carboxylic acid esters may be used alone as one type or in a combination of two types or more. Among these, at least one type selected from isobutyl (meth)acrylate and n-butyl (meth)acrylate (that is, butyl (meth)acrylate) is preferable.

In the present embodiment, the ethylene/unsaturated carboxylic acid ester copolymer is more preferably an ethylene (meth)acrylic acid ester copolymer, and particularly preferably at least one type selected from an ethylene/(meth) acrylic acid isobutyl copolymer and an ethylene/(meth) acrylic acid n-butyl copolymer.

In the present embodiment, "(meth)acrylic acid" means acrylic acid, methacrylic acid, or acrylic acid and methacrylic acid, and examples of the ethylene/(meth)acrylic acid ester copolymer include ethylene/acrylic acid ester copolymers, ethylene/methacrylic acid ester copolymers, and the like.

The ethylene/unsaturated carboxylic acid ester copolymer according to the present embodiment may be used alone as one type or in a combination of two types or more.

In the ethylene/unsaturated carboxylic acid ester copolymer according to the present embodiment, when the total of the ethylene/unsaturated carboxylic acid ester copolymer is 100% by mass, the structural unit derived from ethylene is preferably 70% by mass or more and 97% by mass or less from the viewpoint of adhesion and processability, more preferably 72% by mass or more and 95% by mass or less, and particularly preferably 75% by mass or more and 92% by mass or less.

In the ethylene/unsaturated carboxylic acid ester copolymer according to the present embodiment, when the total of the ethylene/unsaturated carboxylic acid ester copolymer is 100% by mass, the structural unit derived from unsaturated carboxylic acid ester is preferably 3% by mass to 30% by mass from the viewpoint of adhesion and processability, more preferably 5% by mass to 28% by mass, and particularly preferably 8% by mass to 25% by mass.

When the melt flow rate (MFR) of the ethylene/unsaturated carboxylic acid ester copolymer is measured based on JIS K7210: 1999 at 190° C. with a load of 2160 g, 50 g/10 min or less is preferable from the viewpoint of suppressing the generation of bubbling when assembling the paper container, 25 g/10 min or less is more preferable, and 9.0 g/10 min or less is even more preferable. The lower limit of the MFR is not particularly limited, but 0.1 g/10 min or more is preferable from the viewpoint of resin processability such as film formation, 1.0 g/10 min or more is more preferable, and 3.0 g/10 min or more is even more preferable.

The method for manufacturing the ethylene/unsaturated carboxylic acid ester copolymer according to the present embodiment is not particularly limited, and manufacturing by a known method is possible. For example, it is possible to obtain the above by radical copolymerization of each polymerization component at high temperature and under high pressure. In addition, a commercially available ethylene/unsaturated carboxylic acid ester copolymer may be used.

The lower limit of the content of the structural unit derived from the unsaturated carboxylic acid with respect to the entire resin component in the resin composition (A) is preferably 1% by mass or more, more preferably 2% by mass or more, and even more preferably 3% by mass or more. On the other hand, the upper limit of the content of the structural unit derived from the unsaturated carboxylic acid with respect to the entire resin component in the resin composition (A) is preferably 20% by mass or less, more preferably 15% by mass or less, and even more preferably 10% by mass or less.

Setting the lower limit of the content of the structural unit derived from the unsaturated carboxylic acid in the range described above makes it possible to further increase the adhesion between the adhesive layer 120 and the barrier layer 130, in particular, as described below, the adhesion in a case of using aluminum foil as the barrier layer 130. On the other hand, setting the upper limit of the content of the structural unit derived from the unsaturated carboxylic acid in the range described above, reduces the risk of causing defects such as foam and gel during resin processing (film formation) and makes stable film formation processing possible.

The lower limit of the content of the structural unit derived from the unsaturated carboxylic acid ester with respect to the entire resin component in the resin composition (A) is preferably 1% by mass or more, and more preferably 2% by mass or more. On the other hand, the upper limit of the content of the structural unit derived from the unsaturated carboxylic acid ester with respect to the entire resin component in the resin composition (A) is preferably 20% by mass or less, and more preferably 15% by mass or less.

Setting the lower limit of the content of the structural unit derived from the unsaturated carboxylic acid ester in the range described above makes it possible to further increase the adhesion between the adhesive layer 120 and the barrier layer 130, in particular, as described below, the adhesion in a case of using PET as the barrier layer 130. Setting the upper limit of the content of the structural unit derived from unsaturated carboxylic acid ester in the range described above makes the processability excellent.

When the melt flow rate (MFR) of the resin composition (A) is measured based on JIS K7210: 1999 at 190° C. with a load of 2160 g, the MFR is 9.0 g/10 min or less, preferably 8 g/10 min or less, and more preferably 7 g/10 min or less. The resin composition (A) including a copolymer selected from the group consisting of the specific ethylene/unsaturated carboxylic acid/unsaturated carboxylic acid ester copolymer described above and, as an arbitrary component, a specific ethylene/unsaturated carboxylic acid copolymer and an ethylene/unsaturated carboxylic acid ester copolymer, and setting the upper limit of the MFR of the resin composition (A) in the range described above makes it possible to suppress the generation of bubbling when the paper container is assembled. The lower limit of the MFR is not particularly limited, but is preferably 0.1 g/10 min or more from the viewpoint of resin processability such as film formation, more preferably 1.0 g/10 min or more, and even more preferably 3.0 g/10 min or more.

In addition to the ethylene/unsaturated carboxylic acid/unsaturated carboxylic acid ester copolymer, ethylene/unsaturated carboxylic acid copolymer, and ethylene/unsaturated carboxylic acid ester copolymer described above, the resin composition (A) may also include a resin such as polyolefin. In addition, the resin composition (A) may include additives such as antioxidants, stabilizers, lubricants, adhesives, and colorants.

In the resin composition (A) according to the present embodiment, when the entire resin composition (A) is 100% by mass, the total content of the ethylene/unsaturated carboxylic acid/unsaturated carboxylic acid ester copolymer, the ethylene/unsaturated carboxylic acid copolymer, and the ethylene/unsaturated carboxylic acid ester copolymer is preferably 60% by mass or more from the viewpoint of adhesion, more preferably 90% by mass or more, and particularly preferably 95% by mass or more.

The thickness of the adhesive layer 120 is not particularly limited, but is typically approximately 10 to 50 μm.

The adhesive layer 120 may be multiple layers of two layers or more having an adhesive layer including the resin composition (A) described above and a known adhesive layer such as a polyolefin resin (here, a layer structure in which the paper base material layer 110 and an adhesive layer including the resin composition (A) described above are in contact), and, from the viewpoint of productivity, two layers having an adhesive layer including the resin composition (A) described above and a known adhesive layer such as a polyolefin resin (here, a layer structure in which the paper base material layer 110 and an adhesive layer including the resin composition (A) described above are in contact) or a single-layer adhesive layer including the resin composition (A) are desirable, and a single-layer adhesive layer including the resin composition (A) is more desirable.

The barrier layer 130 is a layer provided so as to impart gas barrier properties and water vapor barrier properties and so as to further block odors from the outside air, such that odors do not pass to the contents of the paper container formed using the laminate for a paper container 100 described below, and it is possible to preferably use a stretched film such as a uniaxially stretched or biaxially stretched polyethylene terephthalate (PET) film, a polyamide film, or a polyolefin, or an inorganic compound vapor deposition plastic film in which a thin film of an inorganic substance such as aluminum, an inorganic compound such as aluminum oxide or silicon oxide is provided with a thickness of approximately 20 to 100 nm on the stretched film using a vapor deposition method such as physical vapor deposition or chemical vapor deposition, aluminum foil, an ethylene vinyl alcohol copolymer resin film, a vinylidene chloride film, a polyvinyl alcohol film, or the like, and it is possible to more preferably use at least one type selected from a PET film, an inorganic compound vapor deposition plastic film, and aluminum foil. These may be laminated and used as necessary.

The barrier layer 130 may be subjected to a physical treatment such as a corona treatment, a plasma treatment, a flame treatment, or an ozone treatment on the surface on the side to be adhered (or laminated) to the adhesive layer 120 in order to increase the adhesive strength with the adhesive layer 120. In addition, the barrier layer 130 may be subjected to a known anchor coating treatment.

It is possible to apply various known laminating methods to the method for manufacturing the laminate for a paper container 100 of the present embodiment and, in relation to the adhesion between the paper base material layer 110 and the barrier layer 130, it is preferable to include an extrusion step in which the adhesive layer 120 is produced by melt extrusion lamination. The molding apparatus and molding conditions in this extrusion step are not particularly limited, and it is possible to adopt molding apparatuses and molding conditions known in the related art. As the molding apparatus, it is possible to use a T-die extruder or the like. In addition, as molding conditions, it is possible to adopt known molding conditions for melt extrusion lamination.

In the method for manufacturing the laminate for a paper container 100 according to the present embodiment, the extrusion lamination temperature in the extrusion step is appropriately set according to the resin composition (A) described above and is thus not particularly limited; however, 200° C. or higher is preferable from the viewpoint of further improving the adhesion of the laminate, 250° C. or higher is more preferable, and 280° C. or higher is particularly preferable.

The upper limit of the extrusion lamination temperature in the extrusion step is not particularly limited, but is, for example, 350° C. or lower.

According to the laminate for a paper container 100 described above, it is possible to improve the adhesion between the adhesive layer and various known barrier layers while suppressing the generation of bubbling when the paper container is assembled and to increase the protection of the contents of the paper container.

Embodiment 2

Figure 2:
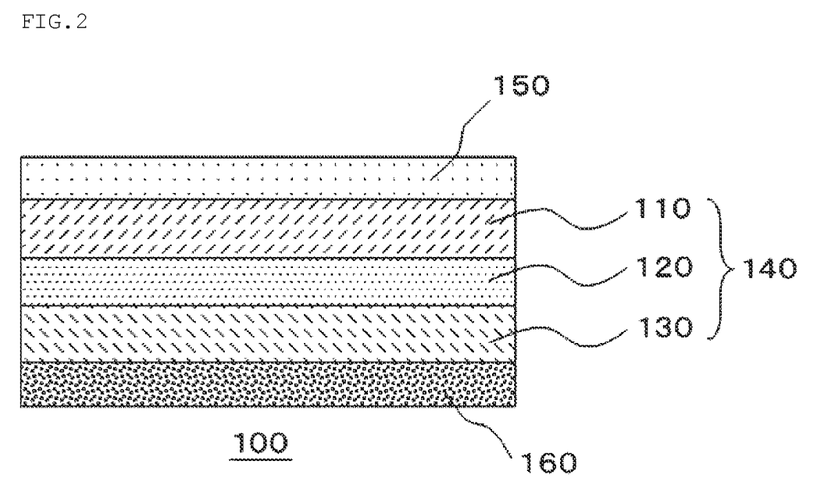
FIG. 2 is a schematic cross-sectional view showing a laminated structure of a laminate for a paper container according to Embodiment 2.

FIG. 2 is a schematic cross-sectional view showing the laminated structure of the laminate for a paper container 100 according to Embodiment 2. The laminate for a paper container 100 of the present embodiment has a laminated structure in which a thermoplastic resin layer 150 is laminated on the outer surface side of the paper base material layer 110 which forms the laminate 140 described in Embodiment 1 and a sealant layer 160 is laminated on the outer surface side of the barrier layer 130.

The thermoplastic resin forming the thermoplastic resin layer 150 is not particularly limited as long as the resin exhibits strong adhesion to the paper base material layer 110 through extrusion lamination; however, a polyolefin is preferably used from the viewpoint of the availability of raw materials, the handleability during molding, the productivity, and economy and, for example, low-density polyethylene (LDPE) or the like is used, or, in a case where the content to be filled in the paper container is a liquid which is easily influenced by scented components or the like, a polyester is used, for example, polyethylene terephthalate (PET). Using the thermoplastic resin layer 150 makes it possible to obtain a waterproof property and a heat-sealing property and to further improve the protection of the contents when the paper container is formed with the laminate for a paper container 100. The thickness of the thermoplastic resin layer 150 is approximately 2 to 100 μm, preferably 10 to 80 μm, and more preferably 20 to 60 μm.

As the sealant layer 160, polyolefin is preferably used since thermal adhesion is necessary between the sealant layers 160 or between the sealant layer 160 and the thermoplastic resin layer 150, for example, low-density polyethylene (LDPE), linear low-density polyethylene (LLDPE), or the like is used; however, in a case where polyester is used for the thermoplastic resin layer 150, a polyester is used, for example, polyethylene terephthalate (PET). The sealant layer 160 obtains a heat-sealing property when forming the paper container with the laminate for a paper container 100 and a waterproof property for the contents with respect to the liquid and makes it possible to further increase the protection of the contents.

Here, a brief description will be given below of a specific example of the method for manufacturing the laminate for a paper container 100 of the present embodiment. First, a laminate of the thermoplastic resin layer 150 and the paper base material layer 110 and a laminate of the barrier layer 130 and the sealant layer 160 are formed. Then, the adhesive layer 120 is supplied between the layer surface of the paper base material layer 110 in the laminate of the thermoplastic resin layer 150 and the paper base material layer 110 and the layer surface of the barrier layer 130 in the laminate of the barrier layer 130 and the sealant layer 160, and laminated and integrated therewith.

According to the present embodiment, it is possible to improve the adhesion between the adhesive layer and the barrier layer while suppressing the generation of bubbling when the paper container is assembled and to further increase the protection of the contents of the paper container.

(Paper Container)

The laminate for a paper container 100 of each embodiment described above is suitably used as a material for a paper container such as a gable top type paper container or a brick type paper container. The method for manufacturing a paper container from the laminate for a paper container 100 is not particularly limited and examples thereof include a method of heating and molding using a known paper container molding machine. A paper container formed using the laminate for a paper container 100 is excellent in adhesion between the adhesive layer 120 and the barrier layer 130 and bubbling is also suppressed. For this reason, the paper container is excellent in the protection of the contents and also makes it possible to extend a storage period.

Although embodiments of the present invention were described above, these are illustrations of the present invention and it is also possible to adopt various configurations other than the above.

For example, in Embodiment 2, only one of the thermoplastic resin layer 150 and the sealant layer 160 may be laminated.

EXAMPLES

A description will be given below of the present invention using Examples and Comparative Examples; however, the present invention is not limited thereto.

As resin compositions for an adhesive layer (Examples 1 to 5, Comparative Examples 1 to 3 and 5), ethylene/methacrylic acid/isobutyl acrylate copolymers produced with the blending amounts of the monomers shown in Table 1 were prepared. In addition, polyethylene was prepared as a resin composition (Comparative Example 4) for an adhesive layer. Furthermore, an ethylene/methacrylic acid/isobutyl acrylate copolymer produced with the blending amounts of monomers shown in Table 2 was prepared as a resin composition (Example 6) for an adhesive.

(MFR Measurement)

The MFR of each resin composition was measured at 190° C. with a load of 2160 g based on JIS K7210: 1999. The results obtained for the MFR are shown in Table 1.

(Bubbling Property Evaluation)

Two types of laminates for a paper container having the following layer structure were produced in order from the outer layer.

<Layer Structure (a)>

First layer (thermoplastic resin layer): LDPE (low-density polyethylene, manufactured by DuPont-Mitsui Polychemicals Co., Ltd., Mirason 16P MFR 3.7 g/10 min, density 923 kg/m$^3$), thickness 20 μm Second layer (paper base material layer): Cup base paper (manufactured by Oji F-Tex Co., Ltd., paper density 260 g/m$^2$)

Third layer (adhesive layer, containing the resin composition described above): Refer to Table 1 for resin composition, thickness 30 μm Fourth layer (adhesive layer): Resin composition (manufactured by DuPont-Mitsui Polychemicals Co., Ltd., Nucrel N0908C, MFR 8 g/10 min, density 930 kg/m$^3$, methacrylic acid content 9% by mass), thickness 10 μm Fifth layer (anchor coating layer): Anchor coating agent (manufactured by Dainichiseika Color & Chemicals MFG Co., Ltd., Seikadyne 2710A+Seikadyne 2710C, solid concentration 7% by mass, 2 g (wet)/m$^2$ coating)

Sixth layer (barrier layer): PET (polyethylene terephthalate film, manufactured by Toray Industries, Inc., Lumirror, thickness 12 μm)

Here, the fourth layer and fifth layer are layers provided such that the adhesion of the third layer (adhesive layer) and the sixth layer (barrier layer) does not influence the bubbling property occurring in the interlayer between the second layer (paper base material layer) and the third layer (adhesive layer).

<Production Method>

Using an extrusion laminator having a 65 mmφ extruder (L/D=28), the second layer was subjected to an in-line corona treatment under processing conditions A (temperature under die 315° C., air gap 110 mm, processing speed 80 m/min), then, the molten film of the first layer was extruded to produce a laminated film (A laminate).

Under processing conditions B (under die temperature 290° C., air gap 110 mm, processing speed 80 m/min), an anchor coating agent was in-line coated on the corona-treated surface of the sixth layer PET film (fifth layer formation), the molten film of the fourth layer was extruded, and a laminated film (B laminate) was produced.

Under processing conditions C (under die temperature 315° C., air gap 110 mm, processing speed 80 m/min), the outer surface of the second layer of the A laminate was subjected to an in-line corona treatment, then, a molten film which is the third layer was extruded between the outer surface of the second layer of the A laminate and the outer surface of the fourth layer of the B laminate, and a laminate for a paper container was produced.

<Layer Structure (b)>

First layer (thermoplastic resin layer): LDPE (low-density polyethylene, manufactured by DuPont-Mitsui Polychemicals Co., Ltd., Mirason 16P MFR 3.7 g/10 min, density 923 kg/m$^3$), thickness 20 μm Second layer (paper base material layer): Cup base paper (manufactured by Oji F-Tex Co., Ltd., paper density 260 g/m$^2$)

Third layer (adhesive layer, containing the resin composition described above): Refer to Table 1 for resin composition, thickness 30 μm Fourth layer (adhesive layer): LDPE (low-density polyethylene, manufactured by DuPont-Mitsui Polychemicals Co., Ltd., Mirason 11P MFR 7.2 g/10 min, density 917 kg/m$^3$), thickness 10 μm Fifth layer (anchor coating layer): Anchor coating agent (manufactured by Dainichiseika Color & Chemicals MFG Co., Ltd., Seikadyne 2710A+Seikadyne 2710C, solid concentration 7% by mass, 2 g (wet)/m$^2$ coating)

Sixth layer (barrier layer): PET (polyethylene terephthalate film, manufactured by Toray Industries, Inc., Lumirror, thickness 12 μm)

Here, the fourth layer and fifth layer are layers provided such that the adhesion of the third layer (adhesive layer) and the sixth layer (barrier layer) does not influence the bubbling property occurring in the interlayer between the second layer (paper base material layer) and the third layer (adhesive layer).

<Production Method>

Using an extrusion laminator having a 65 mmφ extruder (L/D=28), the second layer was subjected to an in-line corona treatment under processing conditions A (temperature under die 315° C., air gap 110 mm, processing speed 80 m/min), then, the molten film of the first layer was extruded to produce a laminated film (A laminate).

Under processing conditions B (under die temperature 315° C., air gap 110 mm, processing speed 80 m/min), an anchor coating agent was in-line coated on the corona-treated surface of the sixth layer PET film (fifth layer formation), the molten film of the fourth layer was extruded, and a laminated film (B laminate) was produced.

Under processing conditions C (under die temperature 315° C., air gap 110 mm, processing speed 80 m/min), the outer surface of the second layer of the A laminate was subjected to an in-line corona treatment, then, a molten film which is the third layer was extruded between the outer surface of the second layer of the A laminate and the outer surface of the fourth layer of the B laminate, and a laminate for a paper container was produced.

<Bubbling Property Evaluation Method>

Using a bubbling phenomenon evaluation apparatus (refer to Utility Model Registration No. 3152258), bubbling property evaluation was carried out under the following conditions on the sixth layer surface of the layer structure (a) and the sixth layer surface of the layer structure (b).

Set temperature: 190° C.
Hot air volume: 3 m$^3$/hour
Hole diameter: 2 mm
Number of holes: 1
Distance between blowing hole and sample: 7 mm From the time the hot air heating started, whether or not a change occurred on the heating surface was visually observed and the time required until the change occurred from the time the hot air heating started was measured. The measurement described above was performed five times on the same sample and the average time was calculated. The results obtained for the bubbling property are shown in Table 1.

(Adhesive Strength Evaluation)

The adhesive strength with respect to the Al foil and the adhesive strength with respect to the uncoated surface of a transparent vapor-deposited film (PET film with an inorganic compound vapor-deposited on one surface, 12 μm) were measured in the following manner.

<Layer Structure for Measuring Adhesive Strength to Al Foil (c)>

PET (12 μm)/anchor coating agent/LDPE (15 μm)/Al foil (7 μm)/adhesive layer (containing the resin composition described above, refer to Table 1) (30 μm)/LL-Film (40 μm)

<Adhesive Strength to Uncoated Surface of Transparent Vapor-Deposited Film (d)>

Transparent vapor-deposited film (12 μm)/adhesive layer (containing the resin composition described above, refer Table 1) (30 μm)/LL-Film (40 μm)

Specific materials used in the layer structures (c) and (d) are as follows.

PET: Polyethylene terephthalate film, manufactured by Toray Industries, Inc., Lumirror, thickness 12 μm Anchor coating agent: manufactured by Dainichiseika Color & Chemicals MFG Co., Ltd., Seikadyne 2710A+C, solid concentration 7 wt %, 2 g (wet)/m$^2$ coating LDPE: Low-density polyethylene, manufactured by the applicant, Mirason 16P, MFR 3.7 g/10 min, density 923 kg/m$^3$ Al foil: Aluminum foil, manufactured by UACJ Corporation, 1N30, thickness 7 μm LL-Film: manufactured by Mitsui Chemicals Tohcello, Inc., low-density polyethylene film TUX-MCS, thickness 40 μm Transparent vapor-deposited film (PET film with inorganic compound vapor-deposited on one surface, 12 μm)

<Production Method>

Using an extrusion laminator having a 65 mmφ extruder (L/D=28), a PET film was subjected to in-line coating with an anchor coating agent under processing conditions D (temperature under die 320° C., air gap 110 mm, processing speed 80 m/min), and a molten film of LDPE was extruded between the PET film and the Al foil to produce a laminated film (C laminate). Under processing conditions E (under die temperature 315° C., air gap: 110 mm, processing speed 80 m/min), a molten film consisting of the resin composition described above was extruded between the C laminate and LL-Film layer, and a laminate was produced for measuring the adhesive strength to the Al foil.

On the other hand, under processing conditions F (temperature under die 315° C., air gap: 110 mm, processing speed 80 m/min), a molten film consisting of the resin composition described above was extruded between the uncoated surface of the transparent vapor-deposited PET and the LL-Film layer, and a laminate was produced for measuring the adhesive strength to the transparent vapor-deposited PET.

<Adhesive Strength Evaluation Method>

Using a peel strength tester (manufactured by INTESCO Co., Ltd., IM-20X-ST type tensile tester), the adhesive strength between the Al foil and the adhesive layer in the laminate having the layer structure (c) and the adhesive strength between the transparent vapor-deposited PET and the adhesive layer in the laminate having the layer structure (d) were measured under the conditions described below. The results obtained for the adhesive strength are shown in Table 1. Here, as a practical standard in a case of being used as a paper container, there is a demand for the adhesive strength to be 0.8 N/15 mm or more.

Shape: Strip shape with a 15 mm width in the flow direction (MD)
Peel strength measurement speed: 300 mm/min
Peel angle: T-peel

TABLE 1

| | | Example 1 | Example 2 | Example 3 | Example 4 | Example 5 | Comparative Example 1 |
|---|---|---|---|---|---|---|---|
| Adhesive layer (resin composition) | Structural unit derived from ethylene (% by mass) | 87.7 | 89.1 | 90.4 | 93.4 | 93.1 | 91.3 |
| | Structural unit derived from methacrylic acid (% by mass) | 4.8 | 4.9 | 5.1 | 3.9 | 3.6 | 8.7 |
| | Structural unit derived from isobutyl acrylate (% by mass) | 7.5 | 6.0 | 4.5 | 2.7 | 3.3 | 0 |

TABLE 1-continued

| | | | | | | | |
|---|---|---|---|---|---|---|---|
| Resin composition: MFR (g/10 min) | | | 6.2 | 4.6 | 3.4 | 3.6 | 4.7 | 8.0 |
| Bubbling property (sec) | | Layer structure (a) | 12.0 | 14.0 | 30 or more | 30 or more | 13.1 | 13.2 |
| | | Layer structure (b) | — | — | — | — | — | — |
| Adhesive strength (N/15 mm) | To Al foil | Layer structure (c) | 7.2 | 6.6 | 5.9 | 6.4 | 4.5 | 2.7 |
| | To transparent vapor-deposited film | Layer structure (d) | 1.2 | 1.8 | 1.8 | 1.0 | 1.0 | 0.1 |

| | | | Comparative Example 2 | Comparative Example 3 | Comparative Example 4 | Comparative Example 5 |
|---|---|---|---|---|---|---|
| Adhesive layer (resin composition) | | Structural unit derived from ethylene (% by mass) | 88.5 | 92.0 | 100 | 81.0 |
| | | Structural unit derived from methacrylic acid (% by mass) | 4.0 | 2.0 | 0 | 11.0 |
| | | Structural unit derived from isobutyl acrylate (% by mass) | 7.5 | 6.0 | 0 | 8.0 |
| Resin composition: MFR (g/10 min) | | | 14.0 | 10.0 | 3.7 | 10.0 |
| Bubbling property (sec) | | Layer structure (a) | 9.3 | 7.5 | — | 10.1 |
| | | Layer structure (b) | — | — | 19.7 | — |
| Adhesive strength (N/15 mm) | To Al foil | Layer structure (c) | 7.9 | 8.0 | 0.6 | 10.4 |
| | To transparent vapor-deposited film | Layer structure (d) | 3.1 | 1.8 | 0.6 | 0.8 |

TABLE 2

| | | | Example 6 |
|---|---|---|---|
| Adhesive layer (resin composition) | | Structural unit derived from ethylene (% by mass) | 81.2 |
| | | Structural unit derived from methacrylic acid (% by mass) | 4.2 |
| | | Structural unit derived from isobutyl acrylate (% by mass) | 14.6 |
| Resin composition: MFR (g/10 min) | | | 4.1 |
| Bubbling property (sec) | | Layer structure (a) | 30 or more |
| | | Layer structure (b) | — |
| Adhesive strength (N/15 mm) | To Al foil | Layer structure (c) | 6.0 |
| | To transparent vapor-deposited film | Layer structure (d) | 6.0 |

As shown in Table 1 and Table 2, in cases where the adhesive layers of Examples 1 to 6 were used, there was a good bubbling resistance property, and in both cases of the layer structure (c) and the layer structure (d), it was also confirmed that an adhesive strength of 0.8 N/15 mm or more was obtained. On the other hand, in Comparative Example 1 having no structural unit derived from unsaturated carboxylic acid ester, it was confirmed that the adhesive strength was inferior in the case of the layer structure (d). In Comparative Examples 2, 3, and 5 using a resin composition having an MFR of greater than 9 g/10 min, it was confirmed that the bubbling property was inferior. In both cases of the layer structure (c) and the layer structure (d) in Comparative Example 4 in which a low-density polyethylene was used as the fourth layer (adhesive layer) and only the polyethylene was used as the third layer (adhesive layer), it was confirmed that the adhesive strength was inferior.

This application claims priority based on Japanese Patent Application No. 2019-007189 filed on Jan. 18, 2019, the entire disclosure of which is incorporated herein.

REFERENCE SIGNS LIST

100: laminate for a paper container
110: paper base material layer
120: adhesive layer
130: barrier layer
140: laminate
150: thermoplastic resin layer
160: sealant layer

The invention claimed is:
1. A laminate for a paper container comprising:
a laminate in which a paper base material layer, an adhesive layer, and a barrier layer are laminated in this order, the adhesive layer includes a resin composition (A) containing one or more selected from the group consisting of an ethylene/unsaturated carboxylic acid/unsaturated carboxylic acid ester copolymer, an ethylene/unsaturated carboxylic acid copolymer, and an ethylene/unsaturated carboxylic acid ester copolymer and including at least the ethylene/unsaturated carboxylic acid/unsaturated carboxylic acid ester copolymer, a melt flow rate (MFR) of the resin composition (A) at 190° C. and with a load of 2160 g is 9.0 g/10 min or less, based on JIS K7210: 1999, and an adhesive strength between an Al foil and the adhesive layer, measured under a condition described below, is 0.8 N/15 mm or more, the condition:

Shape: Strip shape with a 15 mm width in the flow direction (MD),

Peel strength measurement speed: 300 mm/min, and

Peel angle: T-peel.

2. The laminate for a paper container according to claim 1,
wherein a content of a structural unit derived from an unsaturated carboxylic acid with respect to the entire resin component in the resin composition (A) is 1% by mass or more and 20% by mass or less.

3. The laminate for a paper container according to claim 1,
wherein a content of a structural unit derived from an unsaturated carboxylic acid ester with respect to the entire resin component in the resin composition (A) is 1% by mass or more and 20% by mass or less.

4. The laminate for a paper container according to claim 1, further comprising:
a sealant layer laminated on an outer surface of the barrier layer.

5. The laminate for a paper container according to claim 1, further comprising:
a thermoplastic resin layer laminated on an outer surface of the paper base material layer.

6. A paper container obtained by using the laminate for a paper container according to claim 1.

7. The laminate for a paper container according to claim 1,
wherein the melt flow rate (MFR) of the resin composition (A) at 190° C. and with a load of 2160 g is 6.2 g/10 min or less, based on JIS K7210: 1999.

8. The laminate for a paper container according to claim 1,
wherein the melt flow rate (MFR) of the resin composition (A) at 190° C. and with a load of 2160 g is 3.4 g/10 min or more and 6.2 g/10 min or less, based on JIS K7210: 1999.

9. The laminate for a paper container according to claim 8,
wherein a content of a structural unit derived from an ethylene with respect to a total of the ethylene/unsaturated carboxylic acid/unsaturated carboxylic acid ester copolymer is 75% by mass or more and 94% by mass or less,
a content of a structural unit derived from an unsaturated carboxylic acid with respect to the total of the ethylene/unsaturated carboxylic acid/unsaturated carboxylic acid ester copolymer is 2% by mass or more and 10% by mass or less, and
a content of a structural unit derived from an unsaturated carboxylic acid ester with respect to the total of the ethylene/unsaturated carboxylic acid/unsaturated carboxylic acid ester copolymer is 2% by mass or more and 15% by mass or less.

10. The laminate for a paper container according to claim 1,
wherein the adhesive layer is either one of:
two layers consisting of a first adhesive layer including the resin composition (A) and a second adhesive layer of polyolefin resin, the first adhesive layer being in direct contact with the paper base material layer, or
a single-layer consisting of the first adhesive layer including the resin composition (A).

11. A laminate for a paper container comprising:
a laminate consisting of a paper base material layer, a barrier layer, an adhesive layer between the paper base material layer and the barrier layer, optionally a first anchor coating layer between the paper base material layer and the adhesive layer, and optionally a second anchor coating layer between the adhesive layer and the barrier layer,
wherein the adhesive layer is either one of:
two layers consisting of a first adhesive layer including a resin composition (A) and a second adhesive layer of polyolefin resin, the first adhesive layer being in direct contact with the paper base material layer or the first anchor coating layer, the second adhesive layer being in direct contact with the barrier layer or the second anchor coating layer, or
a single-layer consisting of the first adhesive layer including the resin composition (A),
the resin composition (A) containing one or more selected from the group consisting of an ethylene/unsaturated carboxylic acid/unsaturated carboxylic acid ester copolymer, an ethylene/unsaturated carboxylic acid copolymer, and an ethylene/unsaturated carboxylic acid ester copolymer and including at least the ethylene/unsaturated carboxylic acid/unsaturated carboxylic acid ester copolymer, and
a melt flow rate (MFR) of the resin composition (A) at 190° C. and with a load of 2160 g is 9.0 g/10 min or less, based on JIS K7210: 1999.

12. The laminate for a paper container according to claim 11,
wherein the adhesive layer consists of the first adhesive layer including the resin composition (A).

13. A manufacturing method of manufacturing the laminate for a paper container according to claim 1, the method comprising:
adhering the paper base material layer and the barrier layer to each other by melt-extrusion lamination of the adhesive layer between the paper base material layer and the barrier layer.

* * * * *